United States Patent [19]
Kobusch

[11] Patent Number: 6,146,073
[45] Date of Patent: Nov. 14, 2000

[54] THREADED INSERT MADE OF WIRE

[75] Inventor: Klaus Kobusch, Bielefeld, Germany

[73] Assignee: Bollhoff GmbH Verbindungs - und Montagetechnik, Bielefeld, Germany

[21] Appl. No.: 09/269,365

[22] PCT Filed: Sep. 24, 1997

[86] PCT No.: PCT/EP97/05250

§ 371 Date: May 27, 1999

§ 102(e) Date: May 27, 1999

[87] PCT Pub. No.: WO98/13609

PCT Pub. Date: Apr. 2, 1998

[51] Int. Cl.[7] .................................................. F16B 37/12
[52] U.S. Cl. ..................... 411/178; 411/438; 411/929.1
[58] Field of Search ................................. 411/16, 17, 18, 411/178, 438, 929.1

[56] References Cited

U.S. PATENT DOCUMENTS

| | | |
|---|---|---|
| 2,152,681 | 4/1939 | Caminez . |
| 2,390,514 | 12/1945 | Cram . |
| 2,745,457 | 5/1956 | Lang ..................... 411/929.1 |
| 2,869,224 | 1/1959 | Forster . |
| 2,874,741 | 2/1959 | Brancato ................ 411/929.1 |
| 3,272,250 | 9/1966 | Hattan . |
| 3,316,795 | 5/1967 | Tann . |
| 4,645,398 | 2/1987 | Cosenza et al. ............ 411/438 |

FOREIGN PATENT DOCUMENTS 1575256   3/1967   Germany .

*Primary Examiner*—Neill Wilson
*Attorney, Agent, or Firm*—Seyfarth, Shaw

[57] ABSTRACT

The invention relates to a wire-type screw thread insert for insertion into a tapped hole of a workpiece. A cylindrical body comprising a plurality of helically wound coils is provided with at least one insertion zone which is bent radially inwards from the outer diameter of the cylindrical body and extends about a circumferential angle of about 360° to 720°. This facilitates insertion of the insert into a tapped hole of the workpiece so that special tools required hitherto may be dispensed with because the wire-type screw thread insert of the invention may be readily introduced into the tapped hole and may be threaded thereinto by a simple tool.

7 Claims, 2 Drawing Sheets

$\phi d_1 = \phi D + 0{,}1$ $\phi d_R = \phi D \times 1{,}05$ $\phi d_F = \phi D \times 1{,}08$

THREADED INSERT MADE OF WIRE

BACKGROUND OF THE INVENTION

1. Field of the Invention

The invention relates to a wire-type screw thread insert for insertion into a tapped hole of a workpiece consisting of a cylindrical body comprising a plurality of helically wound coils and an end coil which extends radially inwardly from the outer diameter of the cylindrical body and a use of such a wire-type screw insert in a tapped hole of a workpiece.

2. Description of the Related Art

Such wire-type screw thread inserts have become known, e.g. from U.S. Pat. No. 2,363,789, EP-A-140 812 and EP-A-157 715. Generally, the outer diameter of the cylindrical body is to be designed so as to exceed the outer diameter of the tapped hole in the workpiece so that the diameter of the wire coils is to be reduced when the insert is threaded into the tapped hole of the workpiece in order to provide for a tight grip of the screw thread coils in the tapped hole by resilient deformation of the wire coils. In order to facilitate threading of the wire-type screw thread insert into the tapped hole, half a coil at the end of the cylindrical body is deformed radially inwards in a manner known per se (EP-B1-0 228 981). The minimal outer diameter of the radially deformed portion should be substantially as large as or slightly larger than the associated outer diameter of the tapped hole. Furthermore, with this prior art wire-type screw thread insert the cross-section of the wire at the end thereof is reduced in a predetermined manner in order to facilitate insertion thereof and to avoid damaging the tapped hole. According to U.S. Pat. No. 2,152,681 the outer diameter of the reduced end portion is somewhat smaller than the outer diameter of the tapped hole. The circumferential angle of the reduced diameter portion again is 180°. A similar wire-type screw thread insert has become known from U.S. Pat. No. 2,371,674 wherein, as may be seen in FIGS. 1 and 2 of that document, the end coil extends, following its diameter reducing portion, through a small angular range about a circumferential angle of somewhat more than 180°.

SUMMARY OF THE INVENTION

Nevertheless it is necessary with the prior art wire-type inserts to use a special tool comprising a preclamping cartridge and a spindle to be inserted initially into the wire-type screw thread insert in order to reduce the diameter of the insert before it is threaded into the tapped hole. Such an insertion tool has been described for example in U.S. Pat. No. 4,553,302. While it is possible to reduce the outer diameter in order to facilitate the threading operation, this however will weaken the tight grip, or specific regulations will not be met.

The problem to be solved by the invention is to design the wire-type thread insert such that insertion thereof into the tapped hole will be facilitated and in particular may be performed without a tool for reducing the diameter of the wire-type screw thread insert before insertion thereof This problem is solved by the features of patent claim 1. Advantageous modifications thereof are defined in the subclaims.

In contrast to prior art wire-type screw thread inserts the invention provides for an insertion area consisting of the end coil (of a reduced and constant outer diameter) and the diameter reducing portion which together extend about a circumferential angle of preferably about 360° and more. Even a circumferential angle of about 360° facilitates substantially the insertion operation and above all allows to dispense with the so-called preclamping cartridge for reducing the outer diameter of the wire-type screw thread insert before insertion thereof. This allows to substantially simplify the insertion tool. The end coil with the reduced and constant outer diameter is concentric to the cylindrical body so that the wire-type screw thread inserts will not be misaligned when the insertion tool will be applied. This facilitates insertion of the insert into the tapped hole of the workpiece. Furthermore, the end coil is slightly overdimensioned with the reduced outer diameter of the final coil exceeding the outer diameter of the tapped hole, preferably for 0.1 mm. This enables manual insertion of the end coil into the tapped hole. Overdimensioning of the end coil ensures that the end coil does not extend radially inwards too far so as to interfere with the bolt being screwed into the insert.

When the cylindrical body of the insert has been inserted into the tapped hole, further threading-in of the insert is performed by a simple tool for reducing the outer diameter of the cylindrical body. The tool for example may be a dimensionally mating screwdriver. For engagement of the tool either the wire-type screw thread insert is provided with a tang which is broken off and removed after the insertion operation, or the tool has a nose engaging into a recess of the end coil. An insertion zone designed in accordance with the invention preferably is provided at each end of the wire-type screw thread insert so that no directional orientation of the insert is required for the insertion operation, which would be required when only one end of the insert would be designed in accordance with the invention.

In a manner known per se the length of the screw thread insert before insertion into the tapped hole is somewhat less than after insertion thereof. As a result the pitch angles of the wire-type screw thread insert before assembly are somewhat less than after assembly. With wire-type screw thread inserts of very small pitch angles the invention provides for the insertion zone to extend about a circumferential angle of more than 360°. Preferably, a full intermediate coil will be provided between the end coil and the cylindrical body, with the intermediate coil having an outer diameter between the constant diameter of the end coil and the diameter of the cylindrical body. As a result the end coil will be supported at the insertion tool and cannot move radially inwards so as to enter the interior of the wire-type screw thread insert

BRIEF DESCRIPTION OF THE DRAWINGS

An embodiment of the invention will be explained in more detail with reference to the drawing. In the drawing.

DETAILED DESCRIPTION OF THE INVENTION

Figure 1:
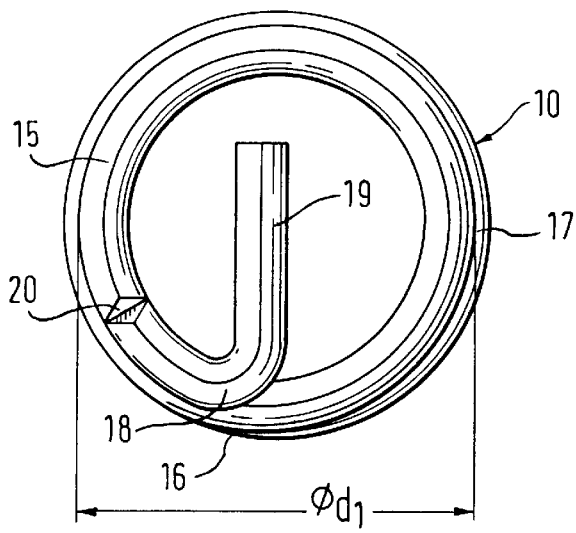
FIG. 1 is an end view of a wire-type screw thread insert having a tang.
Figure 2:
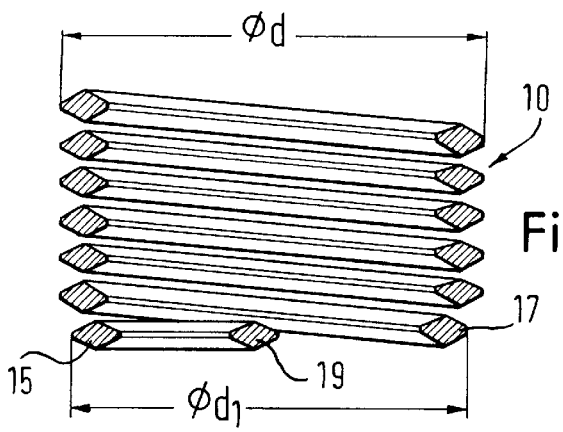
FIG. 2 is a longitudinal section of the wire-type screw thread insert in FIG. 1, FIGS. 3 and 6 are longitudinal cross-sections of the tapped hole in the workpiece.
Figure 3:
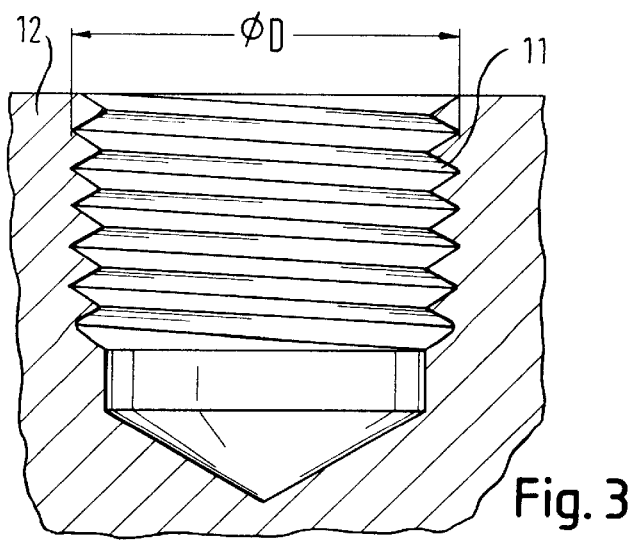

The wire-type screw thread insert 10 as shown n FIGS. 1 and 2 is to be threaded into a tapped hole of an outer diameter D in a workpiece 12 according to FIG. 3.

In a manner known per se the wire-type screw thread insert 10 consists of a plurality of individual coils which are wound to form a cylindrical body of an outer diameter d which somewhat exceeds the tapped hole diameter D and which is dependent on whether the threads of the tapped hole are of a standard pitch type R or a fine pitch type F. When the threads are of the standard pitch type, the outer diameter $D_R$ of the screw thread insert equals the product of the outer diameter D of the tapped hole and the factor 1.05. When the threads are of the fine pitch type the outer diameter $d_F$ of the screw thread insert 10 equals the product of the outer diameter D and the factor 1.08.

FIGS. 1 to 4 furthermore show an insertion zone extending for a full convolution of about 360°, i.e. it is of a reduced outer diameter $d_1$ for more than 180°. This may be recognized in particular in the end view of FIG. 1 where the end coil 15 follows a diameter reducing portion between 16 and 17 so that the insertion zone extends about a full convolution, i.e. for about 360°. In the insertion zone the coils are bent radially inwards from the outer diameter d of the cylindrical body at 16 until the reduced outer diameter $d_1$ of the end coil 15 is reached at the point 17 after a circumferential angle of about 90°. Thereafter, the reduced outer diameter $d_1$ will be constant for more than a circumferential angle of 180°, preferably for about 270°, so that an insertion zone of about 360° will result. This facilitates insertion of the insert into the tapped hole and assists to maintain the wire-type screw thread insert concentrically aligned. The outer diameter $d_1$ equals the hole diameter D plus 0.1 mm.

In the area between the desired break point 20 and the end 18 of the end coil 15 where the end coil arcuately merges into the radial part of the tang 19, the outer diameter is still further reduced so that there will be a transition to the radial portion of the tang 19. This additional diameter reduction will not interfere with a bolt being screwed into the wire-type screw thread insert engaged in the tapped hole 11, because the tang 19 will be cut off at the desired break point 20.

Figure 4:
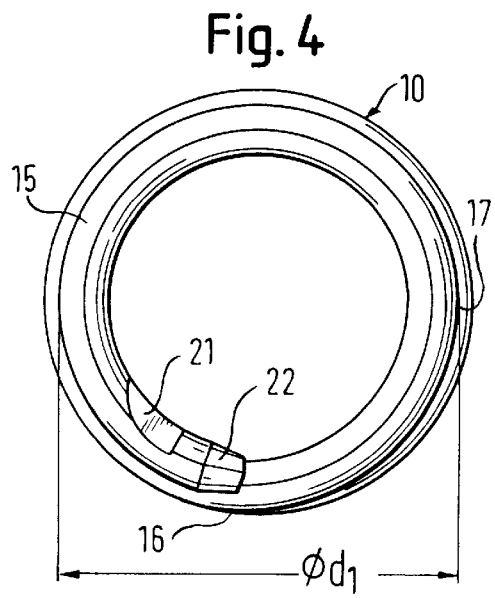
FIG. 4 is an end view of a wire-type screw thread insert having a drive recess.

FIG. 4 shows a wire-type screw thread insert which in a manner known per se is provided with a drive recess 21 which may be engaged by a pawl of a not shown insertion tool in order to thread the insert into the tapped hole. The forward end 22 of the end coil 15 is slightly truncated as is known per se. Otherwise, the end coil 15 and the diameter reducing portion 16, 17 together of about 360° are designed in the manner as explained with reference to FIG. 1 so that the screw thread insert may be inserted into the tapped hole by rotating it manually until the portion of the end coil 15 diametrically opposite to the insertion end thereof will engage the tapped hole in the workpiece so that the insert will have been inserted into the tapped hole whereupon further threading of the insert into the tapped hole is performed by a suitable tool which engages the recess 21.

Even though this has not been shown in the drawing, it goes without saying that the other end of the cylindrical body may also be provided with a similar end coil 15.

Figure 5:
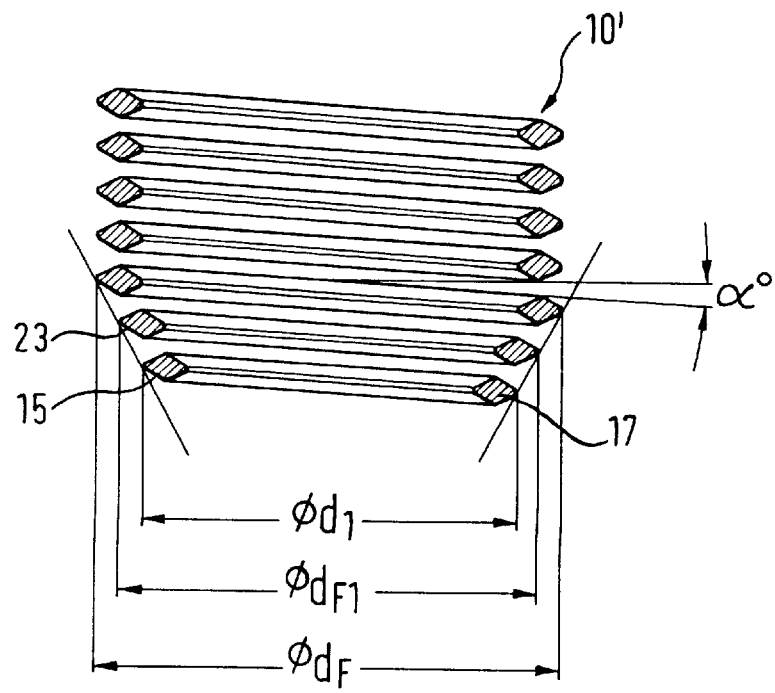
FIG. 5 is a longitudinal section at an enlarged scale of an insertion zone at the end of a wire-type screw thread insert Which has an intermediate coil.
Figure 6:
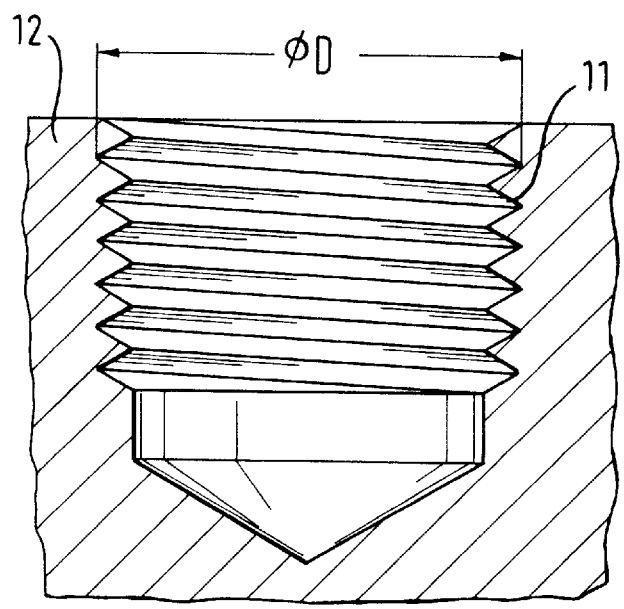

FIG. 5 is a section of an end of a wire-type screw thread insert 10' having an insertion zone consisting of an end coil 15 of an outer diameter $d_1$ and an intermediate coil 23 of an outer diameter $d_{F1}$ when the threads are of the fine pitch type F. The screw thread insert is of an outer diameter $d_F$. Furthermore, the pitch anlge α of the coils after assembly thereof is indicated. The intermediate coil 23 may also be a complete coil of about 360° so that altogether the circumferential angle of the insertion zone including the end coil 15 and the intermediate coil 23 will be about 720° corresponding to an end coil 15 of about 270° plus the diameter reducing portion through the intermediate coil 23 of about 450° as shown in FIG. 5. This ensures that the coils of the insertion zone can engage each other during assembly.

The following relationships for standard pitch threads and fine pitch threads will result:

outer diameter $d_1$ of the end coil=D of the tapped hole plus 0.1 mm.
For fine pitch threads: outer diameter $d_{F1}$ of the intermediate coil 23=D×1,05, outer diameter $d_F$ of the cylindrical body=D×1.08.

If an intermediate coil 23 is required for threads of the standard pitch type, the respective relationships are as follows: outer diameter $d_{R1}$ of the intermediate coil 23=D×1.03, outer diameter $d_R$ of the cylindrical body=D×1.05.

What is claimed is:

1. A wire-type screw thread insert for a tapped hole of a workpiece, said tapped hole have a plurality of threads and said wire-type screw thread insert consisting of a plurality of coils helically wound about a central axis and comprising a cylindrical main section and at least one end section, said cylindrical main section having a first outer diameter and the threads of said tapped hole having a tapped hole outer diameter which is smaller than said first outer diameter by a predetermined amount, said at least one end section consisting of a terminal end portion having a uniform second outer diameter and an intermediate end portion having an outer diameter decreasing from said first outer diameter to said second outer diameter, said tapped hole outer diameter beina smaller than said second outer diameter, said end section extending for 360° to 720° about said central axis and said terminal end portion extending for at least 180° about said central axis, said end section including drive means for engagement of a tool for threading the wire-type screw thread insert into said tapped hole.

2. A wire-type screw thread insert as defined in claim 1 wherein said terminal end portion extends for 270° and said intermediate end portion extends for 450°.

3. A wire-type screw thread insert as defined in claim 1 wherein said first outer diameter of said cylindrical main section equals said tapped hole outer diameter times 1.05 when the threads of said tapped hole are of a standard pitch type.

4. A wire-type screw thread insert as defined in claim 1 wherein said first outer diameter of said cylindrical main section equals said tapped hole outer diameter times 1.08 when the threads of said tapped hole are of a fine pitch type.

5. A wire-type screw thread insert as defined in claim 2 wherein an average outer diameter of said intermediate end portion equals said tapped hole outer diameter times 1.03 when the threads of said tapped hole are of a standard pitch type.

6. A wire-type screw thread insert as defined in claim 2 wherein an average outer diameter of said intermediate end portion equals said tapped hole outer diameter times 1.05 when the threads of such tapped hole are of a fine pitch type.

7. A wire-type screw thread insert as defamed in claim 1 wherein said second outer diameter of said terminal end portion equals said tapped hole outer diameter plus 0.1 mm.

* * * * *